Aug. 24, 1965 R. E. THUN ET AL 3,202,543
METHOD OF FORMING A THIN FILM GRID
Filed June 1, 1962
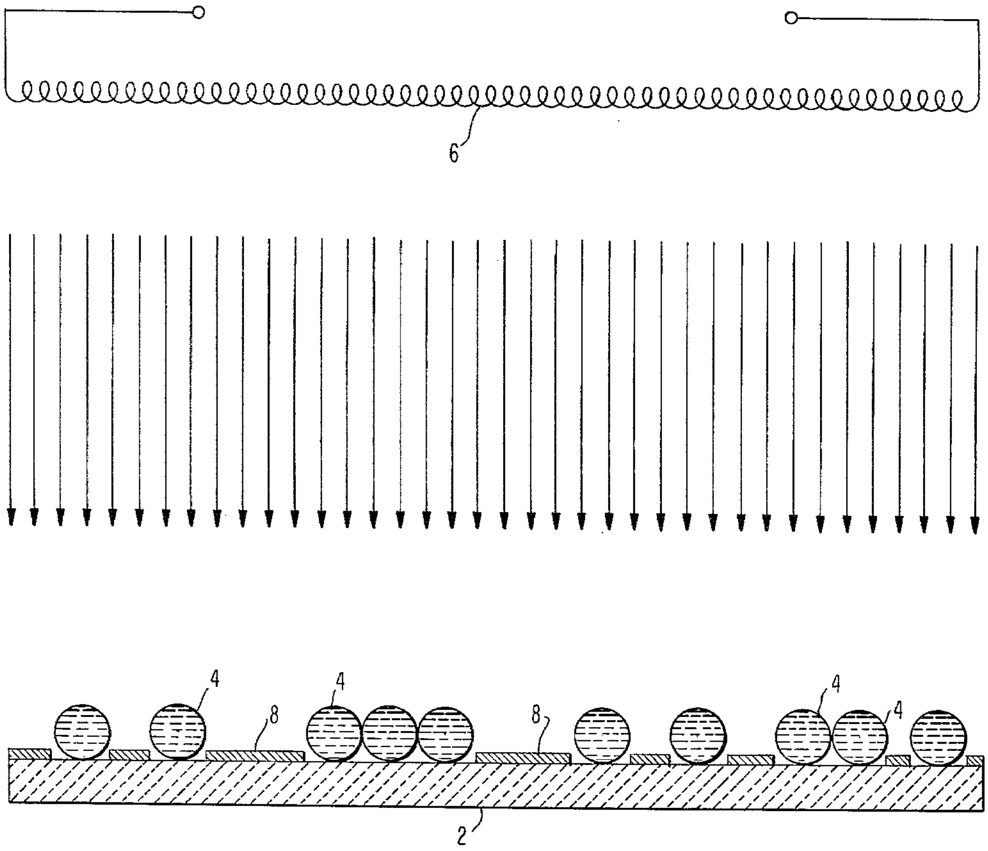
INVENTORS
RUDOLF E. THUN
EDWARD S. WAJDA
BY George Baron
ATTORNEY 3,202,543

METHOD OF FORMING A THIN FILM GRID

Rudolf E. Thun, West Hurley, and Edward S. Wajda, Kingston, N.Y., assignors to International Business Machines Corporation, New York, N.Y., a corporation of New York Filed June 1, 1962, Ser. No. 199,450
4 Claims. (Cl. 117—210)

This invention relates to the fabrication of grid structures, and more particularly to the making of very thin film grids.

In solid state triode devices employing thin film technology, a control grid, made in conjunction with such devices, can be fabricated by vacuum deposition techniques. A control grid of such three terminal device is of the order of 100 A. or less in thickness. In the manufacture of such three terminal devices, it is exceedingly difficult to make a control grid of such small dimensions.

In the fabrication of thin film transistor-like solid state devices, a control grid is necessary for controlling the number of charge carriers that pass from an emitter to the collector, such as a conventional grid controls the electron current in the vacuum tube. It has been found that the characteristics of such a thin grid structure should be as follows:

(1) The grid structure must possess apertures large enough to permit high current density with a minimum of charge loss at the grid.

(2) The grid structure must be fairly uniform to present a homogeneous electrical field over the entire control grid plane.

(3) The charge injection or emission from such grid should be negligible or minimal.

(4) Its manufacture should be consistent with the thin film technology employed to make the thin film device of which the grid is a part.

The above characteristics are realized by employing a dilute suspension of polystyrene spheres in water, which suspension is applied to the surface of a substrate onto which the grid is to be formed. Metal is evaporated onto the plane containing the polystyrene spheres, producing a grid structure by the shadowing effects of the spheres. The polystyrene spheres are removed by chemical dissolution or by washing or rinsing techniques, leaving a thin metallic layer of several angstroms thickness which is electrically continuous, and containing holes to produce the grid structure desired.

Thus, it is an object of this invention to form a novel grid structure.

It is yet another object to provide a method for making a grid structure that is exceedingly thin.

It is a further object to make a grid structure that is compatible with thin film transistor-like structures.

The foregoing and other objects, features and advantages of the invention will be apparent from the following more particular description of a preferred embodiment of the invention as illustrated in the accompanying drawing.

The sole figure of the drawing discloses the technique relied upon to make the novel grid structure to be described herein.

A substrate 2 could be a dielectric layer which will comprise the collector region of the device. Polystyrene spheres are dispersed in a solution of water. The relative concentration of the water and dispersing agent can be quite variable. 0.04 milliliter of this polystyrene solution is mixed with one milliliter of methyl alcohol. This solution is then applied to the substrate 2 and the methyl alcohol is allowed to evaporate. Remaining on the substrate is a random, but statistically uniform, distribution of polystyrene spheres 4 which are about 800 to 880 A. in diameter. Polystyrene latex sphere dispersions are purchaseable from the Dow Chemical Co. and come in various diameters. The choice of diameter will vary with the fineness of the grid desired. In many cases the adhesive forces of these small spheres 4 is enough to cause the latter to adhere to the substrate 2, even when vacuum deposition techniques are employed to deposit metal over such spheres 4. On occasion, one may use chemical binders with the solution of polystyrene spheres and methyl alcohol to increase the adhesion of polystyrene spheres 4 to the surface of substrate 2. The polystyrene spheres 4 may also be statically charged to increase the attraction of substrate 2 for such polystyrene spheres 4.

When the methyl alcohol has evaporated, the polystyrene spheres will form in little clutsers wherein there may be groupings of 1, 2, 3 or 4, etc. spheres at a given location. Statistically, however, there will be no wide variation in the sizes of these clusters. The entire substrate 2 and its adhering globules of polystyrene clusters are placed in an evacuated chamber, and an evaporating source 6, which could be a heated filament having a coating of the material which is to be evaporated upon substrate 2, is actuated to start the deposition process going. The polystyrene spheres 4 act as a mask or shadow as the suitable metal is deposited and a film metal 8 of less than 1.0 micron can be deposited before the evaporating process is terminated. Upon conclusion of the deposition process, the spheres 4 are washed away or dissolved in a solution of toluene. The final result is a thin conductive layer having an electrically continuous path with apertures therein, and such grid structure is of the order of 1 micron or less, a thinness that is highly desirable when making miniature solid state devices.

What is claimed is:

1. A method for making a metallic grid comprising the steps of:

spreading an aqueous dispersion of methyl alcohol and polystyrene spheres onto a substrate;

evaporating said methyl alcohol, thereby forming an apertured mask of said polystyrene spheres;

evaporating onto said substrate, through said apertured mask, a measured number of molecular layers of a metal; and removing said spheres after said evaporation of metal has been terminated.

2. A method for making a very thin metallic grid comprising the steps of:

spreading an aqueous dispersion of solvent and polystyrene spheres onto a substrate in a random fashion;

evaporating said solvent thereby forming an apertured mask of said spheres on said substrate; and evaporating onto said substrate through said apertured mask a metal of a few molecular layers in thickness.

3. A method for making a metallic grid comprising the steps of:

spreading an aqueous dispersion of solvent and of polystyrene spheres onto a suitable substrate, said polystyrene spheres having a diameter of the order of 1000 A. or less;

evaporating said solvent so as to form an apertured mask of polystyrene spheres onto said substrate;

evaporating a predetermined number of molecular layers of metal onto said substrate through said mask; and removing said spheres after said evaporation of metal has been terminated.

4. The method of claim 3 wherein said polystyrene spheres are removed by dissolution in a solution of toluene.

References Cited by the Applicant

UNITED STATES PATENTS

| | | |
|---|---|---|
| 2,815,462 | 12/57 | Auphan. |
| 2,906,637 | 9/59 | Auphan. |

RICHARD D. NEVIUS, *Primary Examiner.*